United States Patent [19]

Acosta

[11] 3,833,241
[45] Sept. 3, 1974

[54] STOWABLE TIEDOWN ATTACHMENTS FOR PICKUP TRUCK BODIES

[76] Inventor: Adrian J. Acosta, 16891 S. Elm Ave., Caruthers, Calif. 93609

[22] Filed: June 14, 1972

[21] Appl. No.: 262,780

[52] U.S. Cl. .......................... 280/179 A, 248/361 A
[51] Int. Cl. ............................................. B60p 7/00
[58] Field of Search ................... 280/179 A, 179 R; 105/368 T; 296/43; 248/361 R, 361 A

[56] References Cited
UNITED STATES PATENTS

| | | | |
|---|---|---|---|
| 1,867,352 | 7/1932 | Churgy | 280/179 A |
| 1,934,165 | 11/1933 | Butterworth | 105/368 T |
| 3,351,356 | 11/1967 | Clark | 280/179 R |
| 3,381,925 | 5/1968 | Higuchi | 280/179 A |

Primary Examiner—Robert R. Song
Attorney, Agent, or Firm—Vergil L. Gerard

[57] ABSTRACT

Disclosed is a stowable tiedown attachment for pickup truck beds consisting of a loop of rope with a tail, and a bored rectangular plate. The plate is carried on the tail by inserting the tail through the bore and then forming a knot in the tail below the plate. The bore is just large enough to pass the rope tail and too small to pass the loop or the knot, and the plate is thus captured between the loop and the knot. The tiedown attachment is placed in a stake well in the pickup truck body by either passing the tail unknotted through a hole in the bottom of the well and then affixing a knot in the tail below the hole, or in the bodies of other designs, by mounting the plate on the tail held by a knot, and then passing the plate through the top opening of the well by angling the plate downward. When the plate is in the well it is disposed horizontally so that when the rope is drawn upwardly the plate catches the sides of the well and prevents removal of the tiedown attachment from the well.

8 Claims, 6 Drawing Figures

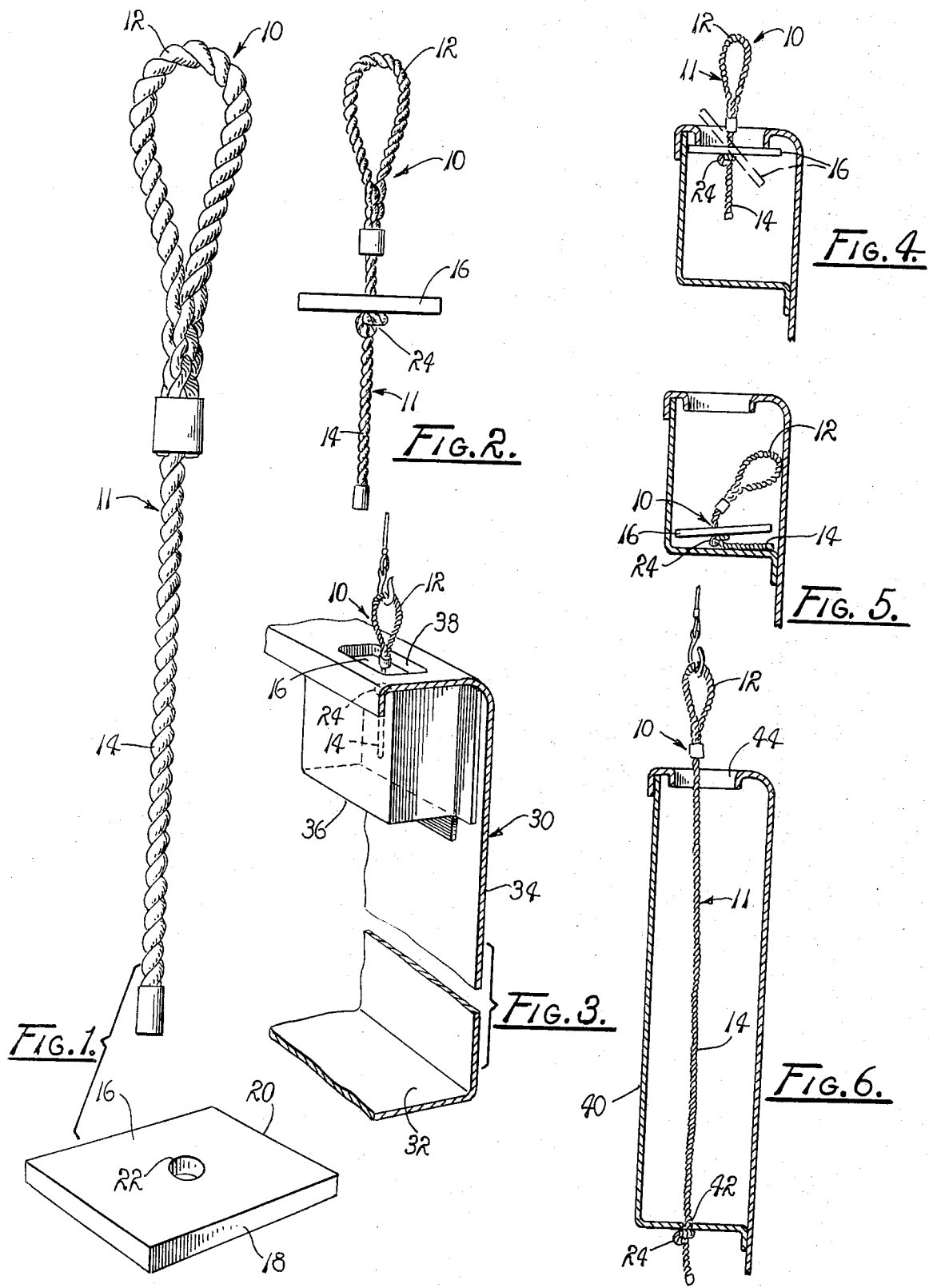

STOWABLE TIEDOWN ATTACHMENTS FOR PICKUP TRUCK BODIES

BACKGROUND OF INVENTION

This invention relates generally to truck tiedowns and more particularly to tiedowns usable on fashion bodied pickups.

In recent years pickup trucks with fashioned bodies have become increasingly popular. The trucks are so designed that they have the fashion styling of a regular passenger automobile but at the same time still have a pickup truck bed. Styling permits a diversity of use for the vehicle. The user can drive it as a car for city use and on other occasions use it as a pickup for hauling.

It is common in truck bodies to provide attachments adjacent the bed to assist in holding a load on the bed. Usually these attachments are stake wells along the edges of the bed, and tiedown hooks for securing load tiedown lines. The difficulty with presently known tiedown attachments is that they must either be permanently affixed to the truck body and, therefore, are unsightly, or if removable, they are difficult to attach, and to detach or stow.

A need, therefore, exists for a simple tiedown attachment which is compatible with fashioned body pickups in that it is readily stowable when not in use, and when in use it is not attached to the vehicle body in an unsightly manner.

SUMMARY OF INVENTION

It is, therefore, a major object of my invention to provide a stowable tiedown attachment for pickup truck bodies which is mountable in the stake wells of the body, and stowable therein when not in use.

It is also an object of my invention to provide a tiedown attachment for pickup trucks of the type described in which the attachment can be readily attached to the pickup truck body and detached therefrom.

It is another object of my invention to provide a tiedown attachment of the type described in which a standardized set of such attachments can be adapted by the user to fit a wide variety of truck bodies.

It is a further object of my invention to provide a tiedown attachment of the type described which is inexpensive to manufacture, simple to use, and will not scratch the body finish.

DRAWINGS

These and other objects and advantages of my invention will become more readily apparent from the following detailed description of a preferred embodiment when read together with the accompanying drawings in which:

FIG. 1 shows an enlarged perspective view of a tiedown attachment embodying my invention.

FIG. 2 shows a side elevational view of my tiedown attachment with a lock plate supported on the tail by a knot.

FIG. 3 shows a perspective view, partially in section, of my tiedown attachment mounted in stake well of a pickup truck body.

FIG. 4 shows an elevational view, partially in section, of my tiedown attachment being inserted into a stake well of a pickup truck body.

FIG. 5 shows an elevational view, partially in section, of my tiedown attachment stowed in a stake well of a pickup truck body.

FIG. 6 shows an elevational view, partially in section, of my tiedown attachment in a different type of pickup truck stake well in which the tail passes out the bottom of the stake well and is held therein by a knot.

DETAIL DESCRIPTION OF PARTS

Referring now to the drawings, and particularly FIG. 1 and 2 thereof, numeral 10 designates generally a preferred embodiment of my invention. The tiedown attachment 10 consists of a rope 11 having a loop 12 and a tail 14, and a rectangular lock plate 16 having a long side 18, a short side 20, and a bore 22. The bore 22 is disposed in the center of the lock plate 16, and is just large enough to pass the tail 14 of the rope 11 but small enough to prevent passage of the loop 12 or of the tail 14 after a knot 24 has been placed in the tail.

The truck body 30, only partially shown (see FIG. 3), has a load bed 32 and load bed sidewalls 34 in which are constructed a plurality of stake wells 36. The stake wells 36 are vertically disposed and have a generally rectangular upper opening 38. In this body model the stake wells 38 are closed at their lower ends. To assemble my tiedown attachment 10 with the stake wells 36 the lock plate 16 is first assembled on the tail 14 by passing the tail through the bore 22 and affixing a knot 24 in the tail below the lock plate (see FIG. 2). The lock plate 16 is then tilted with a short side 20 directed downwardly and is inserted into the top opening 38 of the stake well (see FIG. 4). When the lock plate 16 is fully inserted into the stake well 36, it is released and resumes a generally horizontal position by action of gravity, as long as the tiedown attachment 10 is supported by loop 12. The lock plate 16 is so dimensioned that the short sides 20 are sufficiently short to pass between the edges of all stake wells on commonly used pickup truck bodies, and the long sides 18 are sufficiently long so as not to pass between the edges of such stake wells. Therefore, an upward pull on the loop 12 when the lock plate is in the stake well 36 and horizontally disposed will bring the lock plate into engagement with the inner surface of the stake well opening 38 and prevent the tiedown attachment from being withdrawn from the stake well (see FIG. 4).

The lock plate 16 is preferably formed of rigid plastic material or wood so that it will provide the necessary holding power to secure the tail 14 of the tiedown attachment in the stake well 36 when a tiedown line is passed through the loop 12 and drawn taut over a load (see FIG. 3), but will not scratch the body surface. Also, when formed of these materials the lock plate 16 may be easily cut by the user to tailor it to a stake well which is different from those on commonly used pickups. Other materials may be used, however, the principal requirement being sufficient strength to provide the needed anchor for the tail 14 of the rope.

The rope 11 is preferably made of hemp or plastic material, each having sufficient strength when used in an appropriate weave to hold a tiedown line securing a load. Also, hemp and plastic will not scratch a body finish on the pickup and are sufficiently flexible to permit easy knotting and stowing.

When the tiedown attachment 10 is not in use, the loop 12 and tail 14, as well as the lock plate 16, are allowed to drop down to the bottom of the stake well 36 from which they can be retreived for use by reaching into the stake well with the fingers, grasping the top of the loop 12 and pulling the loop up through the top opening 38 of the stake well. In this stowed position, the tiedown attachment is out of sight but still readily available for use.

In pickup truck bodies having a stake well 40 with a hole 42 in the bottom (see FIG. 6), the lock plate 16 is not used. Instead, the tail 14 of the rope 11 is passed downward through the top opening 44 of the stake well 42 and on through the hole 42 in the bottom of the stake well. The knot 24 is then formed in the lowermost part of the trail 14 below the hole 42 in the bottom of the stake well. The tiedown attachment is thus affixed in the stake well 40 and held therein during use when the loop 12 is pulled above the top opening 44 and engages with a tiedown line to secure a load. To stow the rope 11, the loop 12 is allowed to drop down into the stake well 40 where it will rest out of sight, readily available for future use.

To provide my tiedown attachment with versatility of use and assure its easy adaptability to various styles of pickup bodies, I package my tiedown attachments in groups of eight, which is the maximum number of stake wells on commonly used pickup bodies and will give sufficient tiedown points even in a truck body with more stake wells. In truck bodies with less than eight stake wells, I can either provide a package with a smaller number of attachments or let the user dispose of the extras, whichever proves more economical.

Each of the attachments in the package includes a rope 11 with a loop 12 and tail 4 and a lock plate 16. The tail 14 is sufficiently long to accommodate the deepest stake well in commonly used pickups with stake wells of the type having a hole in the bottom. The tails can be readily cut off to accommodate bodies with shorter stake wells. In bodies having stake wells with holes in the bottom, the lock plates are not necessary and can be disposed of by the user. The provision of this extra material is not a major expense factor, and will probably be more than compensated for by the advantage of minimizing the number of different packages required to fit different body styles. It is possible, with my invention, to fit all body styles of commonly used fashioned body pickups with one package, which results from its greatest versatility.

From this description it will be understood that I have provided a tiedown attachment for pickup truck bodies, particularly of the fashioned body type, which not only is readily adaptable to a large variety of truck bodies but is inexpensive to manufacture and easy to use. I have also provided a tiedown attachment which can be readily stored out of sight in the stake well of the truck body and quickly retreived for use when desired. Since the tiedown attachment can be formed of plastic, hemp, wood or similar materials, it will not scratch the finish of the truck, nor rattle, nor rust.

It will be understood, therefore, that my tiedown attachment is fully capable of achieving the objects and attaining the advantages heretofore attributed to it.

I claim:

1. A tiedown attachment for truck bodies having top opening stake wells comprising:
    a rope having a loop at one end thereof and a tail depending from said loop, said rope having securing means operatively associated with said tail and disposed to releasably engage portions of a stake well in a truck body when said rope is disposed in said stake well with said loop projecting upwardly through the top thereof, and said rope being collapsible into said stake well for storage.

2. A tiedown attachment for truck bodies as described in claim 1 in which:
    said securing means includes a knot formed in said tail below a hole in the top of said stake well, after the end of said tail has been passed downward through said hole.

3. A tiedown attachment for truck bodies as described in claim 1, in which:
    said securing means includes a relatively rigid plate having a shape and size correlated with the shape and size of the top opening of said stake well whereby said plate can pass through said top opening when said plate is disposed in a substantially vertical plane but not when said plate is disposed in a substantially horizontal plane, and attachment means interconnecting said plate with the tail of said rope.

4. A tiedown attachment for truck bodies as described in claim 3, in which:
    said attachment means includes an opening through said plate large enough to snuggly pass the tail of said rope, and an enlargement in the portion of said tail below said opening sufficient to prevent removal of said tail upwardly through said opening.

5. A tiedown attachment for truck bodies having a plurality of stake wells adjacent the bed thereof with top openings therein, a flexible elongated member disposable in a stake well and having interconnect means on a first end thereof, and securing means on a second end thereof engagable with a stake well, said member having a sufficient length for said interconnect means to project above the top opening of said stake well when said securing means is engaged with said stake well, said member being sufficiently flexible for said first end to collapse upon said second end for storage in said stake well, and said securing means being readily disengagable from said stake well by flexing manipulation of said second end of said flexible elongated member.

6. A tiedown attachment as described in claim 5, in which:
    said securing means includes a plate of relatively rigid material having a shape and size correlated with the size and shape of the top openings of said stake wells whereby said plate can pass through said top opening when said plate is disposed in a substantially horizontal plane, and attachment means disposed to interconnect said plate with the second end of said member.

7. A tiedown attachment as described in claim 5, in which:
    said interconnect means includes a loop of sufficient size to pass a tiedown line therethrough and sufficiently small to pass through the top opening of said stake wells.

8. A tiedown attachment as described in claim 5, in which:
    said securing means includes a relatively rigid plate having a configuration sufficient to permit said plate to pass through said top openings when disposed generally vertically and to prevent said plate from passing through said top openings when disposed generally horizontally, and having an opening therethrough sufficiently large to snuggly pass the second end of said member, and said member being sufficiently flexible to knot said second end below the opening in said plate to prevent withdrawal thereof.

* * * * *